(12) United States Patent
Izabel et al.

(10) Patent No.: US 10,836,358 B2
(45) Date of Patent: Nov. 17, 2020

(54) WIPER BLADE COMPRISING A HEATING ELECTRICAL CIRCUIT AND A PTC FUSE

(71) Applicants: Valeo Systemes d'Essuyage, La Verrière (FR); Enmech GmbH, Weinheim (DE)

(72) Inventors: Vincent Izabel, Chilly Mazarin (FR); Gérald Caillot, Cernay la Ville (FR); Jean-Michel Jarasson, Le Mesnil Saint Denis (FR); Dmitry Filatov, Berlin (DE); Thomas Leben, Stahnsdorf (DE); Olaf Runge, Berlin (DE)

(73) Assignees: Valeo Systemes d'Essuyage, La Verrière (FR); Enmech GmbH, Weinheim (DE)

( * ) Notice: Subject to any disclaimer, the term of this patent is extended or adjusted under 35 U.S.C. 154(b) by 6 days.

(21) Appl. No.: 15/876,680

(22) Filed: Jan. 22, 2018

(65) Prior Publication Data
US 2018/0208157 A1 Jul. 26, 2018

(30) Foreign Application Priority Data

Jan. 24, 2017 (EP) .................................... 17305073

(51) Int. Cl.
*B60S 1/38* (2006.01)
*H01C 7/02* (2006.01)
(Continued)

(52) U.S. Cl.
CPC .......... *B60S 1/3803* (2013.01); *B60S 1/3805* (2013.01); *H01C 7/02* (2013.01); *H02H 9/026* (2013.01);
(Continued)

(58) Field of Classification Search
CPC ............................. B60S 1/3803; B60S 1/3805
See application file for complete search history.

(56) References Cited

U.S. PATENT DOCUMENTS 3,243,753 A 3/1966 Kohler
5,572,765 A * 11/1996 Guell .................... B60S 1/3805
15/250.06

(Continued)

FOREIGN PATENT DOCUMENTS

FR 2792764 A3 10/2000
FR 3014388 A1 6/2015

OTHER PUBLICATIONS

European Search Report and Annex to the European Search Report issued in corresponding European Patent Application No. 17305073. 3, dated Jun. 26, 2017 (4 pages).

*Primary Examiner* — Andrew A Horton
(74) *Attorney, Agent, or Firm* — Osha Bergman Watanabe & Burton LLP

(57) ABSTRACT

The invention proposes a wiper blade (10) of a motor vehicle, comprising a heating electrical circuit (30) comprising at least one heating resistive element, which is connected to terminals (36) for supplying electric current, and a component for regulating the electric power supply current, which is a resettable fuse with a positive temperature coefficient (50), known as a PTC fuse. The PTC fuse (50) is, for example, a surface-mounted component, known as a CMS component, which is electrically connected to two belonging electrical connecting areas (44, 46).

17 Claims, 4 Drawing Sheets

(51) Int. Cl.
*H02H 9/02* (2006.01)
*H05B 3/18* (2006.01)
*B60S 1/40* (2006.01)

(52) U.S. Cl.
CPC .............. *H05B 3/18* (2013.01); *B60S 1/381* (2013.01); *B60S 1/3848* (2013.01); *B60S 1/3881* (2013.01); *B60S 1/4006* (2013.01); *B60S 2001/3843* (2013.01); *H05B 2203/02* (2013.01); *H05B 2203/031* (2013.01)

(56) References Cited

U.S. PATENT DOCUMENTS

| | | | |
|---|---|---|---|
| 8,499,407 B2 * | 8/2013 | Caillot | B60S 1/3805 134/45 |
| 2012/0075762 A1 | 3/2012 | Wang et al. | |
| 2013/0193129 A1 | 8/2013 | Jones | |
| 2015/0146334 A1 | 5/2015 | Tseng et al. | |

* cited by examiner

WIPER BLADE COMPRISING A HEATING ELECTRICAL CIRCUIT AND A PTC FUSE

TECHNICAL DOMAIN OF THE INVENTION

The invention relates to a wiper blade comprising a heating electrical circuit embodied in the form of at least one heating resistive element and comprising a component for regulating the electric power supply current of the heating electrical circuit.

TECHNICAL BACKGROUND OF THE INVENTION

In a known manner, a wiper blade of a motor vehicle can be heated, in particular to de-ice it in winter or to use the heat produced by the heating means also to de-ice the outside surface of the window the wiper must clean.

When the wiper blade comprises internal channels for distributing a screen washing liquid, heating the wiper blade can furthermore make it possible to heat the screen washing liquid before it is misted or projected onto the outside surface of the window, which also makes it possible to simplify operations of de-icing the window and can possibly make it possible to avoid using a manual scraper.

In a known manner, a wiper blade of the "Flat blade" type comprises a body with a longitudinal orientation, which supports a wiper strip, generally made in natural or synthetic rubber, which is designed to rub against the outside surface of the window to be wiped, for example a windscreen of a vehicle, in order to evacuate water from it by taking this water out of the field of view of the driver.

Such a type of wiper blade also comprises at least one longitudinal spline, which imparts bending on the wiper strip so as to assist the application of the wiper strip on the outside surface of the window.

The wiper blade is supported by a wiper arm or driving arm that is driven in an alternating movement by an electric driving motor.

The means for attaching the wiper blade to the driving arm can comprise a connector, which is made integral with the longitudinal body, and an adapter, which is mounted to hinge on the longitudinal body, and which is fastened to a free end of the arm.

In a known manner, the heating means call upon a heating electrical circuit, which comprises at least one heating resistive element, such as a heating electrical resistor, which, when it is supplied with electric current, produces heat, which is dispersed into its surroundings.

For example, it has already been proposed to equip the spline for bending a wiper blade with heating means presented in the form of an applied film, which is bonded to at least one of the two opposite flat faces of the spline, and which comprises a heating electrical circuit.

The heating electrical circuit is, for example, a loop of an electrical wire for conducting electricity, whose ends are connected to terminals for supplying electric current.

In the case of a vehicle said to be top range, controlling and protecting the function of heating a wiper blade generally take place directly by means of the electronics and of the electrical circuit of the vehicle.

The function of controlling the heating needs in this case to be integrated during the general definition of the electrical architecture of the vehicle, and said function therefore generates a certain cost.

Controlling the heating of the heated blades can take place by taking account of parameters supplied for example by a temperature sensor of the vehicle and/or a speed sensor of the vehicle.

In a general manner, the heating function is triggered below an outside temperature of +5° C. in order to ensure overall de-icing of the wiper blade, either of channels for distributing screen washing or de-icing liquid, means for attaching the wiper blade to the wiper arm, or even the wiper strip in contact with the windscreen.

Supposing that a sensor were to supply incorrect information such as, for example, the vehicle is running at 150 km/h whereas the vehicle is stopped, or the outside temperature is negative in high summer, an electronic management and controlling module could activate an inappropriate power supply voltage such as for example a voltage of 16 volts instead of a reduced voltage when the vehicle stops, which would bring about a very significant temperature increase and could cause deterioration and even destruction of the heating film equipping the wiper blade.

For example, the effect would be permanent heating of the wiper blade beyond+5° C., potentially in high summer with ambient temperatures above +30° C., with a potential risk capable of causing a hot spot, a short-circuit, physical deterioration of the wiper blade, even the start of a fire in the worst case.

The other functions of the vehicle are therefore not affected in the deteriorated mode of the function, for example in the event of wrong information being supplied by an outside temperature or vehicle running speed sensor, or in the event of failure of such a sensor.

In order to avoid such problems, document US-A1-2013/0193129 has already proposed to call upon a self-regulated heating electrical circuit, which comprises at least one Positive Temperature Coefficient (PTC) electrical conducting element, which, when it is supplied with electric current, produces heat, which is dispersed into its surroundings.

In order to avoid such problems, it has already also been proposed to equip the wiper blade with a regulating component consisting of a heat-fusible fuse, which, when it intervenes, definitively stops the wiper blade heating, making replacement of the wiper blade obligatory. In effect, such a fuse is fitted in series in at least one resistive loop of the heating circuit and its melting definitively interrupts the heating electrical circuit.

BRIEF SUMMARY OF THE INVENTION

The invention proposes a wiper blade of a vehicle, in particular a motor vehicle, comprising:
- at least one heating resistive element, which is connected to terminals for supplying electric current to said element;
- and at least one component for regulating the electric power supply current, characterized in that the regulating component is a resettable fuse with a positive temperature coefficient, known as a PTC fuse.

A fuse known as resettable, or PTC fuse, is also called a Polymeric Positive Temperature Coefficient (PPTC) device.

It is a passive electronic component used for protecting against excess current defects in electronic circuits, which consists of a non-linear thermistor, which returns to a conducting state once the current has dropped, thus acting as a circuit breaker, while allowing the circuit which is equipped with it to function once more without having to replace a component.

The function of such a component is not to release heat, and it is used for its function as a fuse, that is to say, its only function is to cut off the power supply to the heating electrical circuit.

Such a component is characterized by an admissible permanent current (or ampacity), which is the maximum value of the electric current that can permanently pass through a conductor, a device or a unit without its permanent operating temperature in given conditions being higher than a specified value.

When the current passing through the component—which has a low electrical resistance in the on-state—exceeds the limit, the component heats beyond a temperature threshold value and the resistance suddenly increases by several orders of magnitude to a "triggered" value, typically of hundreds of $k\Omega$, which greatly limits the current due to the finite impedance of the current source. The triggering current varies according to the component and the circuit.

The critical material used in a PTC resettable fuse is, for example, a plastic-carbon black composite such as described and shown in American U.S. Pat. No. 3,243,753.

The design of PTC fuses is also described and shown in documents US-A1-2012/0075762 or US-A1-2015/0146334.

According to another characteristic of the invention, the PTC fuse is a surface-mounted component, known as a CMS component, which is electrically connected to two electrical connecting areas belonging to the heating resistive element.

The design of such a CMS component is described and shown, for example, in document FR-A3-2.792.764.

According to other characteristics of the wiper blade:
it comprises a support, which, directly or indirectly, supports the heating resistive element;
the PTC fuse is supported, directly or indirectly, by the support;
the support is a longitudinally elongated element and, directly or indirectly, at least one substantially flat face of the support supports the heating resistive element;
directly or indirectly, the one face of the support supports the PTC fuse;
the terminals for supplying electric current are longitudinally situated in a substantially median zone of the support, said zone extending, for example, from 30 to 70% of the length of the support, measured from one of its opposite longitudinal ends;
directly or indirectly, the support supports at least one heating resistive element on another substantially flat face;
the support is a spline for bending or reinforcing the wiper blade;
the heating resistive element comprises at least one loop whose ends are connected to the terminals for supplying electric current;
the PTC fuse constitutes a section of the loop;
the wiper blade comprises a flexible substrate so as to embody the heating resistive element in the form of a heating film;
it comprises means for attaching the wiper blade to an arm for driving the wiper blade, these attachment means comprising means of electrical connection to the electric power supply terminals;
it comprises protection and sealing means, which surround the PTC fuse and its electrical connecting areas, and which surround said electrical connection means and the terminals for supplying electric current.

BRIEF DESCRIPTION OF THE FIGURES

Other characteristics and advantages of the invention will appear on reading the detailed description that will follow, given as non-limitative and, for whose understanding, reference will be made to the attached drawings, wherein.

DETAILED DESCRIPTION OF THE FIGURES

In the continuation of the description, elements having an identical structure or similar functions will be designated by the same reference numbers.

In the continuation of the description, longitudinal, vertical and transverse orientations will be adopted in a non-limitative manner indicated by the trihedron "L,V,T" of the figures. A horizontal plane is also defined, which extends longitudinally and transversally.

The longitudinal orientation or direction corresponds to the main axis of the wiper blade.

Figure 1:
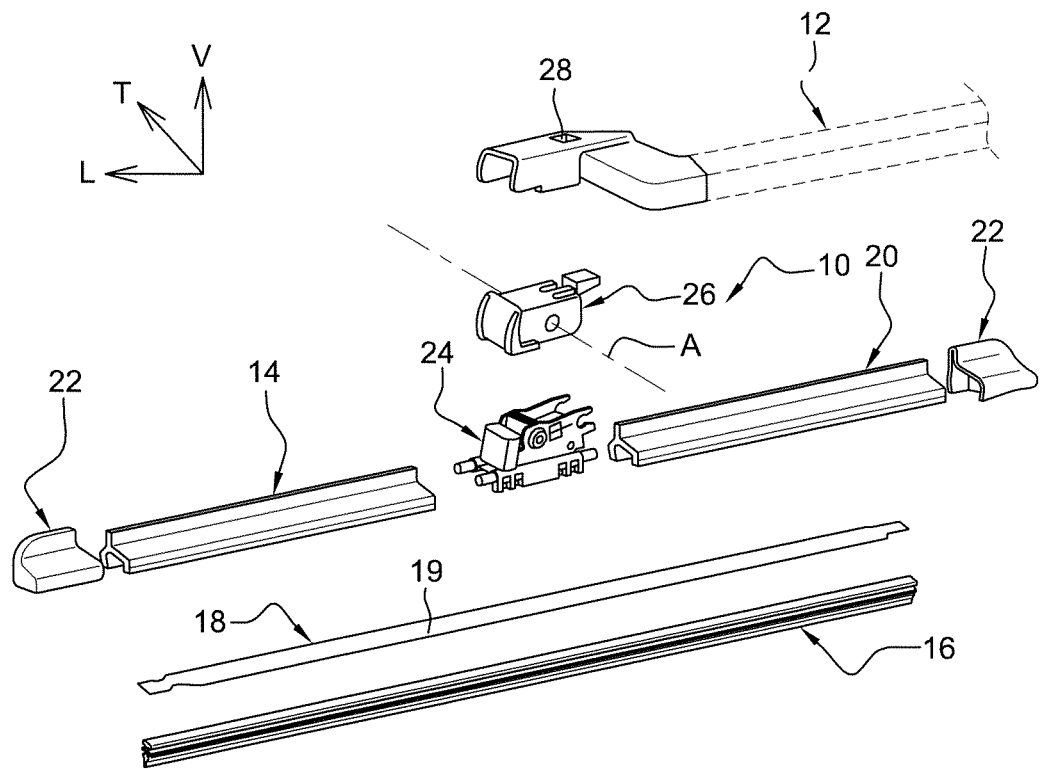
FIG. 1 is an exploded perspective view of a wiper blade of a motor vehicle.

FIG. 1 shows a wiper blade 10, for example, for wiping the outside surface of a motor vehicle windscreen.

An arm 12 for driving the wiper blade 10 is also partially shown, said arm itself being designed to be driven by an electric motor (not shown) so that the wiper blade follows an alternating back and forth movement making it possible to evacuate water, and possibly other undesirable elements, present on the outside surface of the windscreen.

The wiper blade 10 comprises a longitudinal body 14, a wiper strip 16 and at least one spline 18 whose function here is to impart bending on the wiper strip 16 so as to assist the application of the wiper strip on the outside surface of the windscreen according to the geometric shape in three dimensions in space of said outside surface.

The longitudinal body 14 of the wiper blade 10 here comprises an upper deflector 20, which is designed to improve the functioning of the wiper blade, the function of the deflector 20 being to improve the downward pressure of the wiper strip 16 on the outside surface of the windscreen and hence to improve the aerodynamic performance of the wiper system as a whole.

The wiper blade 10 further comprises end fittings or clips 22 for clipping the wiper strip 16 and the spline 18 to the longitudinal body 14, the clips 22 here being situated at each of the two opposite longitudinal ends of the longitudinal body 14.

The longitudinal body 14 of the wiper blade 10 is embodied here in two independent parts, which are placed one in relation to the other substantially end to end, and which are connected one to the other by an intermediate connector 24.

In order to ensure the assembly and attachment of the wiper blade 10 on the wiper arm 12, the wiper blade 10 comprises an adapter 26, which is mounted on the intermediate connector 24 and which allows the wiper blade 10 to hinge relative to the arm 12.

The hinging of the wiper blade 10 relative to the wiper arm 12 is based on a pivoting movement around a pivoting axis A with a transverse orientation orthogonal to the longitudinal axis of the wiper blade 10.

In effect, the wiper blade 10 must have at least one degree of freedom in rotation or pivoting relative to the wiper arm 12, and more precisely relative to a terminal or distal part 28 equipping the free end of the driving arm 12 so as to allow the wiper blade 10 to follow the curve in space of the outside surface of the windscreen.

In a known manner, the wiper blade 10 is equipped with a heating circuit, which consists essentially of a support and one or more heating resistive elements providing a heating electrical resistance function, said elements being supported by the support, the heating element being integrated in the wiper blade 10.

Figure 2:
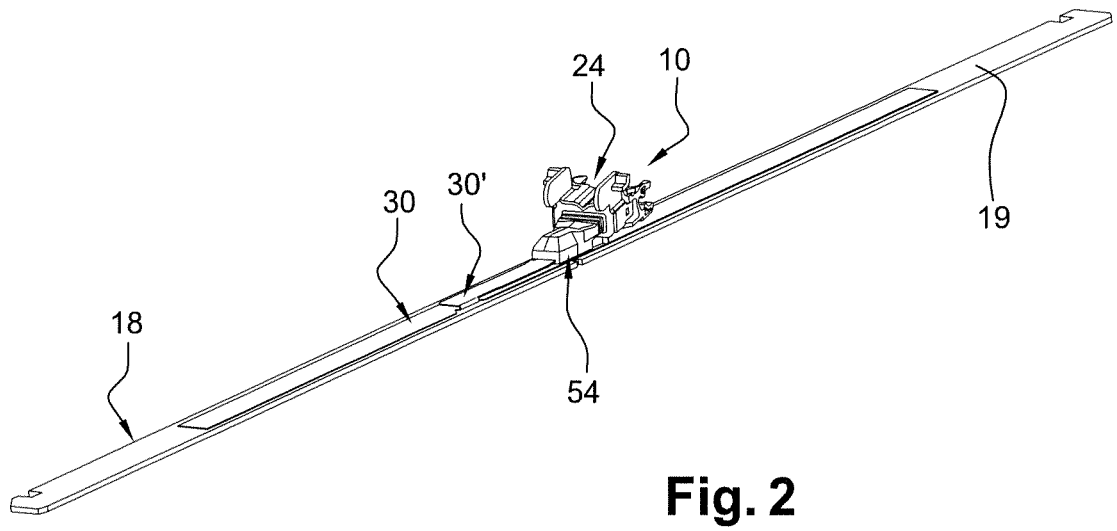
FIG. 2 is a perspective view of a wiper blade of the same type as on FIG. 1, comprising an example of an embodiment of a heating circuit associated with a PTC fuse according to the invention.
Figure 3:
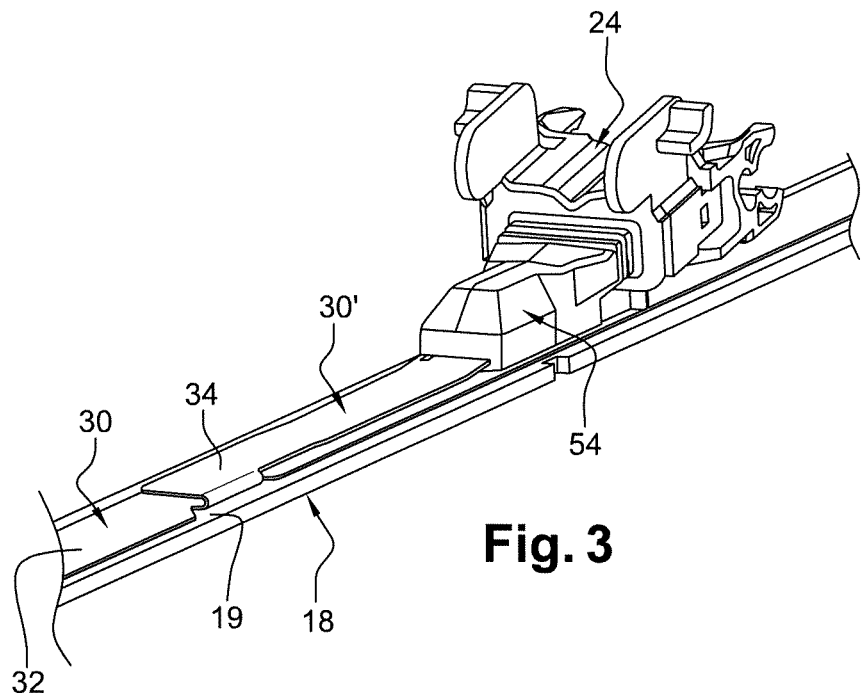
FIG. 3 is a larger scale view of a detail of the median longitudinal part of the wiper blade of FIG. 2.
Figure 4:
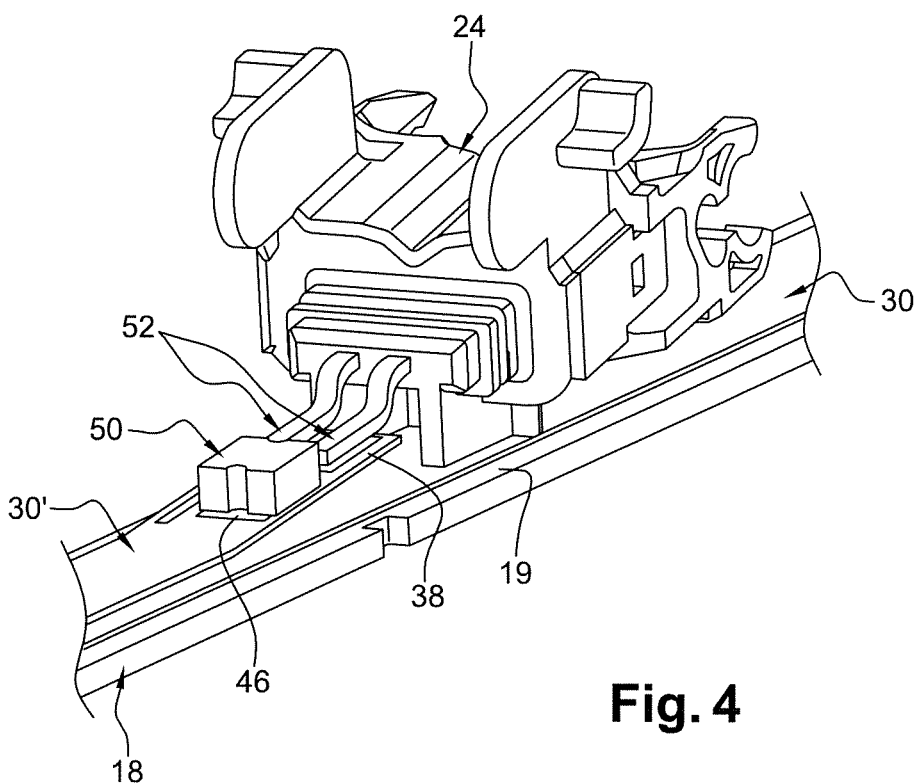
FIG. 4 is a larger scale view of a detail of the median longitudinal part of the wiper blade of FIG. 3, shown without the means for protecting the attachment and electrical connection zones.

According to a design such as that illustrated on FIG. 2 and the following figures, the heating circuit is designed to equip one face of a spline 18, and for example the upper face 19.

As can be seen in particular on FIG. 2, the heating element 30 is presented in the form of a heating film, which is applied to the substantially flat upper face 19 of the bending spline 18.

The heating film 30 comprises a substrate 32 made in a material not conducting electricity, which here is of a generally rectangular shape whose dimensions, length and width, are such that they allow the heating film 30 to be adjusted and installed on the bending spline 18 of determined dimensions, here on a median part or portion of the total length of the bending spline 18.

The substrate 32 is thus, for example, a sheet of flexible plastic or synthetic material. As an example, the heating film consists of two layers of substrate, upper and lower, which encapsulate the heating material, such as, for example, a conducting section, in order to ensure that the film is waterproof.

Without limitation, the heating film 30 here comprises a median central attachment and electrical connection part 30', which is a portion folded at one hundred and eighty degrees, which is superposed on the main part of the heating film 30, which is applied to the upper face 19 of the bending spline 18.

The substrate 32 can comprise, on its lower face designed to cooperate with the upper face 19 of the spline 18, an adhesive coating so as to allow the heating film 30 to be fixed by bonding to said adhesive coating.

The substrate 32 supports one or more heating resistive elements designed to be connected to a source supplying electric current, here of the motor vehicle.

Figure 6:
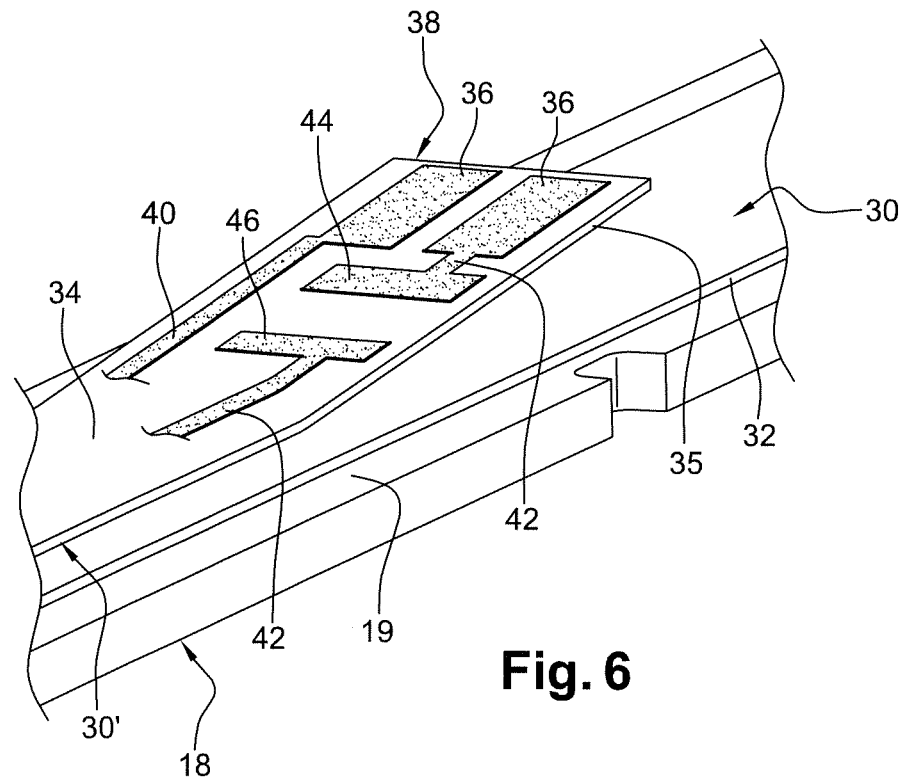
FIG. 6 is a view similar to that of FIG. 5, showing the heating circuit without its PTC fuse.

To that effect, the heating film 30 comprises two terminals 36 for supplying electric current, which, as can be seen in particular on FIG. 6, extend here in the upper face 34 of the free end section 38 of the central part of 30' of the heating film 30.

Each of the terminals 36 is connected to an associated conducting section 40 and 42, each of which is designed to be connected to a heating resistive element, or to several heating resistive elements installed in series so as to form a resistive conducting loop designed to be supplied with electric current.

As can be seen in detail in particular on FIG. 6, the terminal 36 is connected to a conducting area 44, which extends broadly transversally, and which is adjacent to another parallel conducting area 46, which is connected in turn, in a manner not shown in detail, to the resistive conducting loop.

Thus, on examining FIG. 6, the heating electrical circuit between the terminals 36 is a circuit interrupted between the conducting areas 44, 46.

Figure 5:
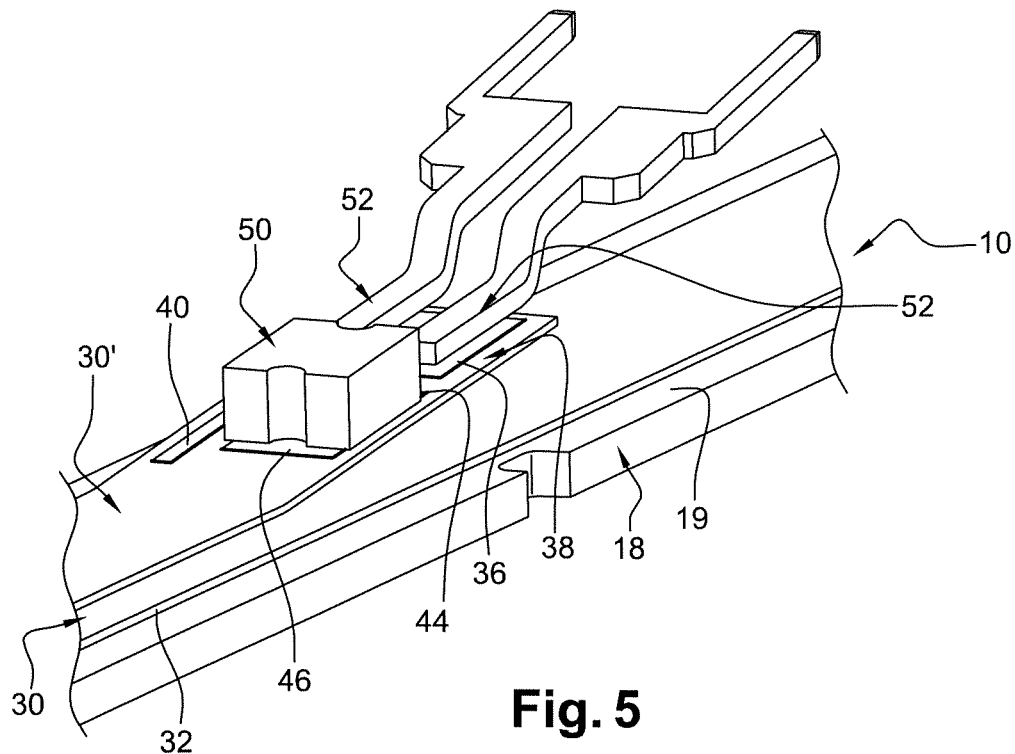
FIG. 5 is a view similar to that of FIG. 4, showing the wiper blade without the intermediate connector, which allows the wiper blade to hinge relative to a driving arm.

The areas 44 and 46 are electrical connecting areas, which allow the attachment and electrical connection of a PTC fuse 50 according to the invention as illustrated on FIG. 5.

The PTC fuse 50 here is a component of the CMS type whose lower face comprises, for example, two connection pins (not shown), each of which is soldered onto an associated electrical connecting area 44, 46.

Figure 7:
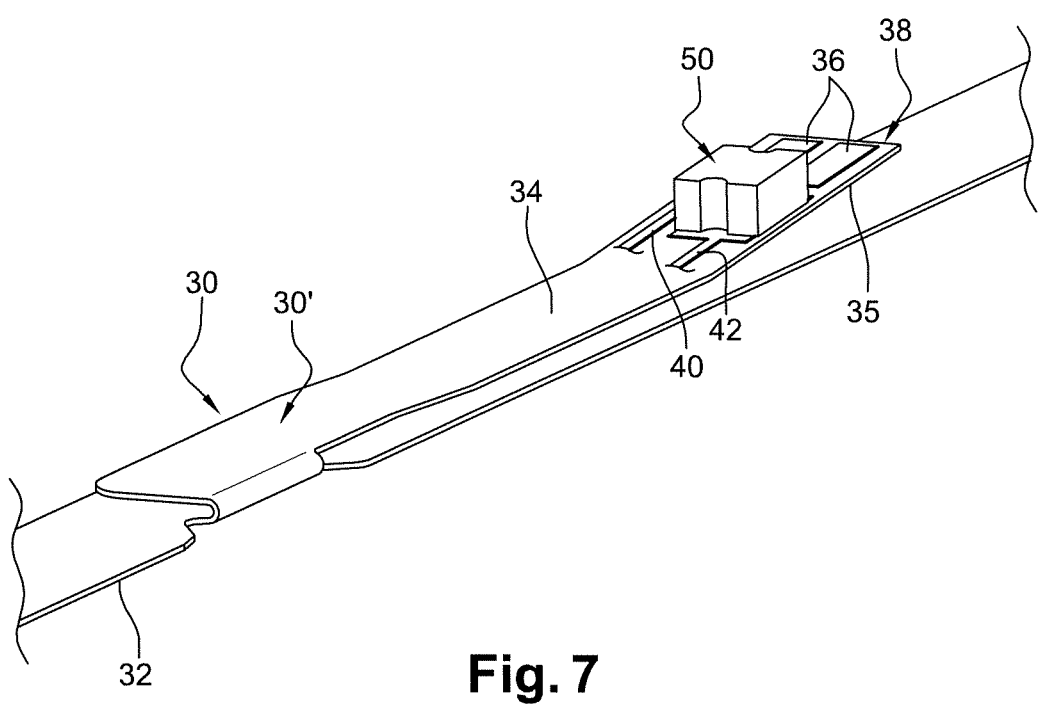
FIG. 7 is larger scale view of a detail of the median longitudinal part of the heating circuit and the PTC fuse illustrated on FIG. 3.

As illustrated on FIG. 7, assembling the PTC fuse 50 with the heating film 30 can be embodied according to a process during which the PTC fuse 50 is fixed by brazing on the associated portion of the heating film so as to constitute a subassembly which is then used like a heating film of the prior art for its assembly, attachment and electrical connection.

Thus, when the PTC fuse 50 is in its "on" state, the heating electrical circuit is closed and an instruction to supply the heating film 30 with electric current makes it possible to provoke heating of the wiper blade 10.

In order to allow the electrical connection of the heating film 30, through its power supply terminals 36, to an electric current source, which belongs, for example, to the motor vehicle equipped with the wiper blade 10, the latter comprises electrical connection means, which are integrated with the intermediate connector 24.

To that effect, the intermediate connector 24 here comprises two electrical connection pins 52, each of which is designed to be soldered to an associated terminal 36 for supplying electric current.

Once the different soldering operations have been performed, in order to protect the attachment and electrical connection zones, and in particular to ensure that they are sealed, the embodiment illustrated on the figures plans to cover all of the zone comprising the power supply terminals 36, the connecting areas 44 and 46, the PTC fuse 50 and the connection pins 52 with a "capsule" 54 for protection and electrical insulation, which is, for example, embodied by injection moulding in situ of a suitable resin.

It can be advantageous to leave a free space around the PTC fuse 50 so as to allow the expansion associated with its functioning, which can be obtained by placing a small cap on the component before coating it with the resin capsule 54.

Either the aforementioned upper layer of substrate is absent in said zone covered by the capsule, or, as a variant, there is an upper layer of substrate with openings or cut-outs made "above" the terminals 36, 44, 46 to allow the PTC fuse 50 and the electrical connection pins 52 to be brazed on these terminals.

In the embodiment given as a non-limitative example, which is illustrated on FIG. 2 and the following figures, the PTC fuse 50 is arranged longitudinally near the intermediate connector 24 in a substantially median zone of the bending spline 18, said zone extending, for example, from 30 to 70% of the length of the spline 18, said length being measured from one of the longitudinal ends of the spline 18.

The arrangement of the PTC fuse 50 indirectly on the upper face 19 of the spline 18 and in said median longitudinal zone of the spline 18 is only an example given without limitation.

Within the framework of the invention, it is possible to arrange the PTC fuse 50 in the same longitudinal zone, but under the lower face 35 of the free end section 38.

The PTC fuse 50 can also be arranged directly on the upper face of the main part of the heating film 30 under the end section 38.

The PTC fuse 50 can even be arranged in the vicinity of one or other of the two opposite longitudinal ends of the bending spline 18.

In so far as the PTC fuse 50 does not need to be reset or replaced after it has possibly intervened as a fuse, the implementation of such a component allows it to be arranged in any zone of the wiper blade allowing it to be electrically connected in series into the heating circuit.

The implementation according to the invention of a PTC fuse 50 is not limited to associating it with a heating electrical circuit embodied in the form of a heating film.

The heating electrical circuit can thus be embodied directly on one of the two opposite faces of the bending spline 18 according to any known technique suitable to that effect and, for example, according to a technique for depositing conducting and resistive layers such as that described and shown in document FR-A-3.014.388.

If the bending spline 18 is embodied in metal so as to benefit advantageously from a significant heat radiation effect, it is then necessary—in particular before depositing an electrically conducting ink in order to make strips for conducting electricity—to coat the upper face 19 with a layer not conducting electricity.

Of course, if the bending spline 18 is itself embodied in a material not conducting electricity, it may then not be necessary to plan depositing a layer of material not conducting electricity between the upper face 19 and the strips 38 for conducting electricity. It is preferably necessary to plan to cover the strips for conducting electricity with a protective insulating layer so as to guarantee good encapsulation.

Neither is the invention limited to arranging a heating electrical circuit and its associated PTC fuse on a support consisting of a spline 18 for bending or reinforcing the wiper blade 10.

It is possible to use the wiper strip 16 or the aerodynamic deflector 20 as a support in the meaning of the invention.

Neither is the invention limited to connecting the electrically heated wiper blade to an electric current source on board the vehicle, as the electric current source can be designed in an "embedded" manner with the wiper blade, or even with the driving arm 12.

The invention claimed is:

1. A wiper blade of a motor vehicle, comprising:
   a heating electrical circuit comprising at least one heating resistive element, which is connected to terminals for supplying electric current; and
   at least one component for regulating the electric power supply current which is distinct from the heating resistive element,
   wherein the regulating component is a resettable fuse with a positive temperature coefficient, known as a PTC fuse wherein an electrical connection part is between the heating electrical circuit and the at least one component.

2. The wiper blade according to claim 1, wherein the PTC fuse is a surface-mounted component, known as a CMS component, which is electrically connected to two electrical connecting areas belonging to the heating resistive element.

3. The wiper blade according to claim 2, further comprising for attaching the wiper blade to an arm for driving the wiper blade, these attachment means comprising means of electrical connection to said electric power supply terminals.

4. The wiper blade according to claim 3, further comprising protection and sealing means, which surround the PTC fuse and its electrical connecting areas, and which surround said electrical connection means and the terminals for supplying electric current.

5. The wiper blade according to claim 1, further comprising a support, which, directly or indirectly, supports said at least one heating resistive element.

6. The wiper blade according to claim 5, wherein the PTC fuse is supported, directly or indirectly, by the support.

7. The wiper blade according to claim 6, wherein the support is a longitudinally elongated element and at least one substantially flat face of the support supports, directly or indirectly, said at least one heating resistive element.

8. The wiper blade according to claim 7, wherein said at least one face of the support supports, directly or indirectly, the PTC fuse.

9. The wiper blade according to claim 7, wherein support supports, directly or indirectly, at least one other heating resistive element on another substantially flat face.

10. The wiper blade according to claim 5, wherein the terminals for supplying electric current are longitudinally situated in a substantially median zone of the support, said zone extending, from 30 to 70% of the length of the support, measured from one of its opposite longitudinal ends.

11. The wiper blade according to claim 5, wherein the support is a spline for bending or reinforcing the wiper blade.

12. The wiper blade according to claim 1, wherein said at least one heating resistive element comprises at least one loop whose ends are connected to said terminals for supplying electric current.

13. The wiper blade according to claim 12, wherein the PTC fuse constitutes a section of the loop.

14. The wiper blade according to claim 1, further comprising a flexible substrate, wherein the flexible substrate and the heating resistive element constitute the heating electrical circuit in the form of a film.

15. A wiper blade of a motor vehicle, comprising:
    a heating electrical circuit comprising at least one heating resistive element, which is connected to terminals for supplying electric current; and
    at least one component for regulating the electric power supply current which is distinct from the heating resistive element,
    wherein the regulating component is a resettable fuse with a positive temperature coefficient, known as a PTC fuse, that is electrically connected to two electrical connecting areas that belong to the heating resistive element wherein an electrical connection part is between the heating electrical circuit and the at least one component.

16. The wiper blade according to claim 15,
    wherein each of the terminals is connected to an associated conducting section,
    wherein each associated conducting section is connected to several heating resistive elements,
    wherein the several heating resistive elements are installed in series to form a resistive conducting loop,
    wherein the two electrical connecting areas extend broadly transversally and are adjacent to each other.

17. The wiper blade according to claim 15, wherein the PTC fuse is electrically connected to the electrical connecting areas by solder.

* * * * *